US009923273B2

(12) United States Patent
Kurz et al.

(10) Patent No.: US 9,923,273 B2
(45) Date of Patent: Mar. 20, 2018

(54) SYSTEM FOR MANUFACTURING AND TUNING AN NFC ANTENNA

(71) Applicant: A.K. Stamping Company, Inc., Mountainside, NJ (US)

(72) Inventors: Arthur Kurz, New Vernon, NJ (US); Bernard Duetsch, Summit, NJ (US)

(73) Assignee: A.K. Stamping Company, Inc., Mountainside, NJ (US)

( * ) Notice: Subject to any disclaimer, the term of this patent is extended or adjusted under 35 U.S.C. 154(b) by 383 days.

(21) Appl. No.: 14/306,857

(22) Filed: Jun. 17, 2014

(65) Prior Publication Data

US 2015/0155612 A1 Jun. 4, 2015

Related U.S. Application Data

(60) Provisional application No. 61/910,642, filed on Dec. 2, 2013.

(51) Int. Cl.
*B23P 21/00* (2006.01)
*B23Q 15/00* (2006.01)
(Continued)

(52) U.S. Cl.
CPC ........... *H01Q 7/005* (2013.01); *H01Q 1/2291* (2013.01); *H01Q 1/38* (2013.01); *H01Q 7/06* (2013.01);
(Continued)

(58) Field of Classification Search
CPC ..... H01Q 1/243; H01F 27/2847; H01F 41/04; Y10T 29/49016; Y10T 29/53022; Y10T 29/53187
(Continued)

(56) References Cited

U.S. PATENT DOCUMENTS

2009/0179812 A1 7/2009 Nakamura et al.
2012/0040128 A1* 2/2012 Finn ................ G06K 19/07783 428/96
(Continued)

FOREIGN PATENT DOCUMENTS

CN 103715501 4/2014

OTHER PUBLICATIONS

International Search Report of the International Searching Authority dated Nov. 4, 2015, issued in connection with International Application No. PCT/US15/35768 (5 pages).
(Continued)

*Primary Examiner* — Thiem Phan
(74) *Attorney, Agent, or Firm* — McCarter & English, LLP

(57) ABSTRACT

A method for manufacturing and turning a near field communication antenna is provided. A method for manufacturing and tuning a near field communication antenna comprising loading one or more ferrite substrates onto a workstation, loading an antenna biscuit onto the workstation, the antenna biscuit comprising one or more interconnected antennas, stamping the antenna biscuit to form one or more individual antennas, applying the one or more individual antennas to the one or more ferrite substrates to form one or more antenna assemblies, and adjusting placement of the one or more individual antennas relative to the ferrite substrates to adjust functional properties of the one or more antenna assemblies.

12 Claims, 13 Drawing Sheets

(51) Int. Cl.
*H01Q 7/00* (2006.01)
*H01Q 1/38* (2006.01)
*H01Q 7/06* (2006.01)
*H01Q 21/00* (2006.01)
*H01Q 1/22* (2006.01)

(52) U.S. Cl.
CPC .... *H01Q 21/0087* (2013.01); *Y10T 29/49016* (2015.01); *Y10T 29/53022* (2015.01); *Y10T 29/53187* (2015.01)

(58) Field of Classification Search
USPC ................. 29/705, 600, 729, 742, 827, 843; 340/539.1, 568.1, 572.7
See application file for complete search history.

(56) References Cited

U.S. PATENT DOCUMENTS

| | | | |
|---|---|---|---|
| 2012/0227248 | A1 | 9/2012 | Orihara et al. |
| 2012/0237728 | A1 | 9/2012 | Kimura et al. |
| 2012/0282857 | A1 | 11/2012 | Zhang |

OTHER PUBLICATIONS

Written Opinion of the International Searching Authority dated Nov. 4, 2015, issued in connection with International Patent Appln. No. PCT/US15/35768 (7 pages).
Supplementary Partial European Search Report dated Jan. 2, 2018 issued in connection with European Patent Application No. 15809953 (18 pages).

* cited by examiner

SYSTEM FOR MANUFACTURING AND TUNING AN NFC ANTENNA

CROSS-REFERENCE TO RELATED APPLICATIONS

This application claims priority to U.S. Provisional Patent Application No. 61/910,642, filed on Dec. 2, 2013, the entire disclosure of which is expressly incorporated herein by reference.

BACKGROUND

Field of the Disclosure

The present disclosure relates to manufacturing and tuning a near field communication antenna. More specifically, the present disclosure relates to tuning a near field communication antenna by adjusting the location of a stamped metal antenna relative to a ferrite substrate.

Related Art

Near field communication (NFC) antennas and antenna assemblies are commonly used in a variety of electronic devices, and more specifically in smartphones. In such devices, the antenna is affixed to a ferrite substrate. The antenna can be formed on the ferrite substrate through a chemical etching process. Ferrite substrates have porosity which is inconsistent across different batches of ferrite and which affects certain functional properties of the antenna assembly, such as inductance.

What would be desired but has not yet been provided is an efficient and effective method for tuning or optimizing an antenna assembly to obtain desired functional properties thereof.

SUMMARY

The present disclosure relates to a method for tuning an NFC (near field communication) antenna. More specifically, the disclosure relates to a method for tuning and/or optimizing an NFC antenna assembly by adjusting/modifying the placement of a stamped metal antenna relative to a ferrite substrate. The placement could be performed by a robotic system and the method could utilize an adaptive and/or manual feedback system.

BRIEF DESCRIPTION OF THE DRAWINGS

The features of the disclosure will be apparent from the following Detailed Description, taken in connection with the accompanying drawings, in which.

DETAILED DESCRIPTION

The present disclosure relates to a method for tuning an NFC (near field communication) antenna, as discussed in detail below in connection with the figures.

Figure 1:
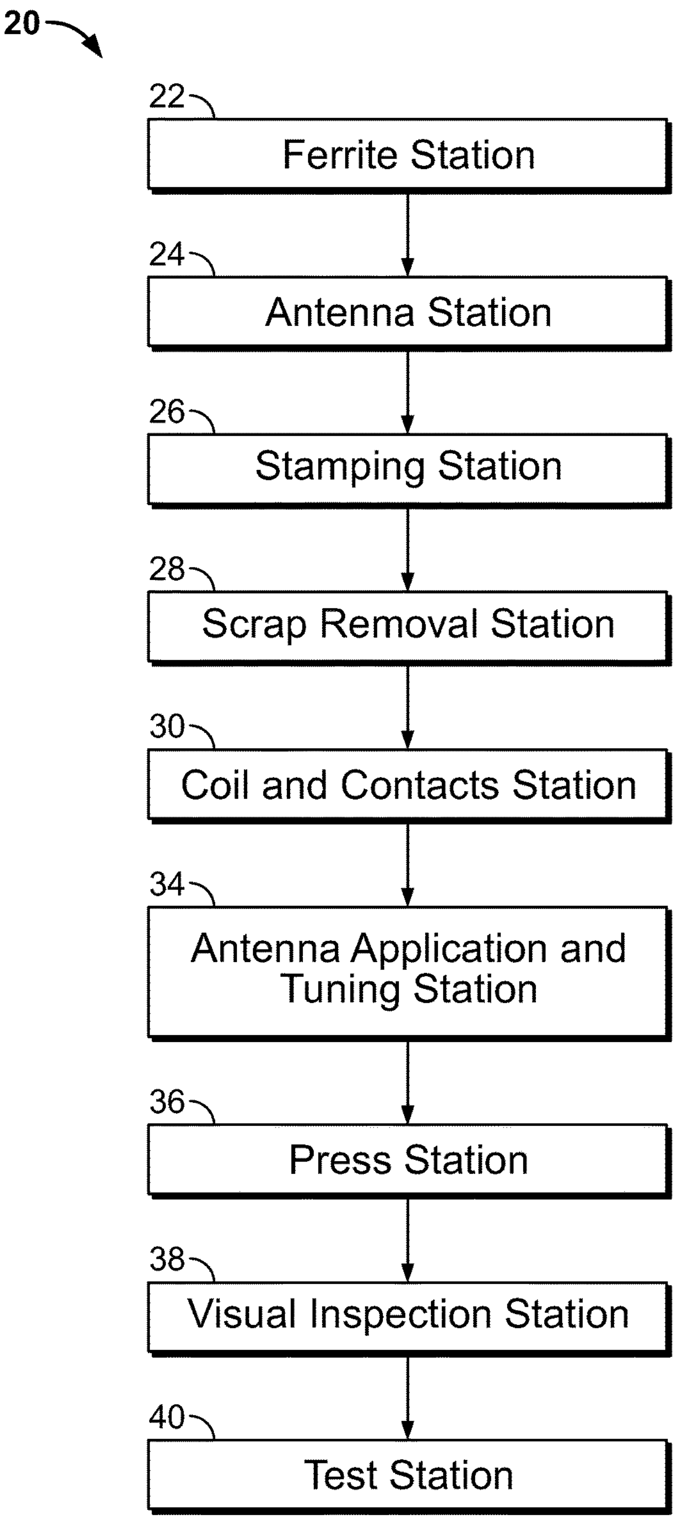
FIG. 1 is a diagram showing a series of stations workflow for manufacturing and tuning an NFC antenna.

FIG. 1 is a diagram showing a series of stations 20 (e.g., assembly line) for manufacturing and tuning an NFC antenna. The line begins at a ferrite station 22, where one or more ferrite substrates are loaded onto a workstation (e.g., movable or stationary), such as a pallet. At antenna station 24, an antenna biscuit having one or more antennas (e.g., metal antennas) is loaded onto the pallet. The plurality of antennas are interconnected with one another and/or a frame to form the biscuit. At the stamping station 26, the individual antennas are separated from one another and from their supports (e.g., singulated). At the scrap removal station 28, the leftover scraps of the biscuit from the stamping station 26 are removed from the pallet.

At the coil and contacts station 30, coil and contacts for a wireless charger are added and the coil is laser soldered to the contacts. At the antenna application and tuning station 34, the one or more individual (e.g., singulated) antennas are each applied to one or more ferrite substrates respectively. At the press station 36, the position of the antenna relative to the ferrite is pressed to ensure and further solidify a solid contact between each of the antennas and ferrite substrates. At the visual inspection station 38, an individual and/or a computer system (e.g., with artificial intelligence) visually inspects the antennas applied to the ferrite (e.g., for any obvious defects). At the test station 40, the individual antennas are tested (e.g., manually or automatically) for compliance and quality control to ensure that they meet the desired specifications. Any antennas found to be defective or deficient are separated and put aside for further analysis.

Many of the foregoing stations are interchangeable so that they could be performed in a variety of orders (e.g., the ferrite station could be after the antenna station, etc.). Further, some stations could be combined into one station (e.g., the ferrite station and antenna station could be combined into a loading station), or a single station could be separated into multiple stations (e.g., the coil and contacts station could be separated into a coil and contacts loading station and a laser solder station). Additionally, some of the foregoing stations could be omitted completely (e.g., coil and contacts station, etc.).

Figure 2:
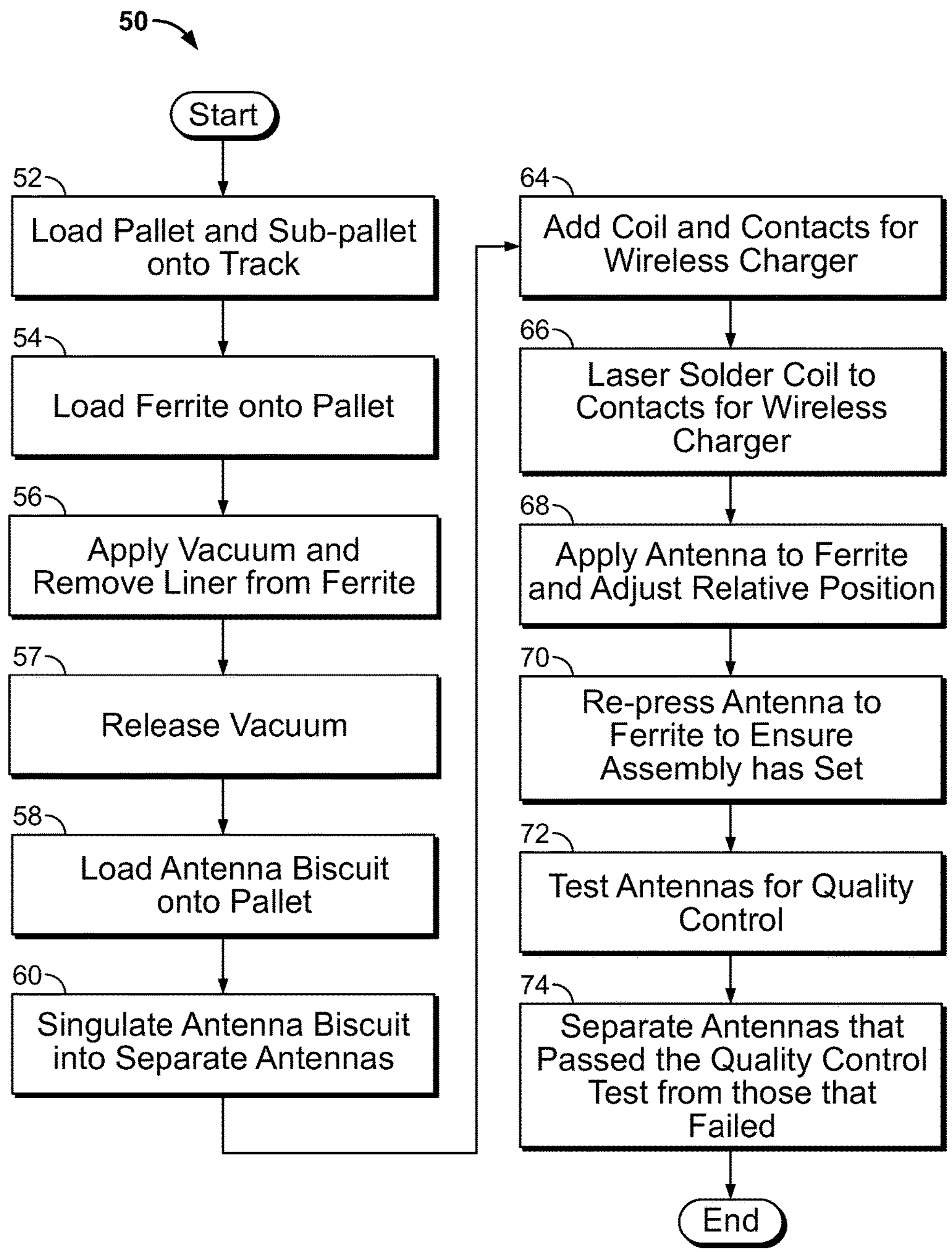
FIG. 2 is a flowchart showing steps for manufacturing and tuning an NFC antenna.

FIG. 2 is a flowchart 50 showing steps for manufacturing and tuning an NFC antenna. In step 52, a pallet and/or paddle are loaded onto a track. The track allows the pallet and paddle to move (e.g., manually or automatically) between stations. The stations are described above with reference to FIG. 1. Although a track is disclosed specifically, any suitable movement between stations could be utilized. In step 54, one or more ferrite substrates is loaded onto a pallet (e.g., manually or automatically), such as by using guidepins on the pallet. In step 56, a vacuum is applied to the pallet to facilitate removal of a liner for the ferrite. The vacuum keeps each ferrite substrate in place relative to the pallet while the liner is removed. Once the liner is removed, the vacuum is released in step 57.

In step 58, an antenna biscuit having one or more antennas is loaded onto the pallet. In step 60, the antennas are separated from the biscuit into individual antennas. Biscuit scraps (e.g., from the biscuit frame) are removed from the pallet (e.g., by vacuum). In step 64, coil and contacts for a wireless charger could be added to the pallet, each of the antennas, and/or each of the ferrite substrate. In step 66, the coil is soldered to the contacts for the wireless charger.

In step 68, discussed in more detail below, the antenna is applied to the ferrite and the location of the antenna relative to the ferrite is adjusted. In step 70, the antenna is re-pressed to ensure that the antenna assembly has set and to further solidify the contact between the antennas and the ferrite substrates. In step 72, the antennas are tested for quality control. In step 74, the antennas that passed the quality control test are separated from those that failed.

Figure 3:
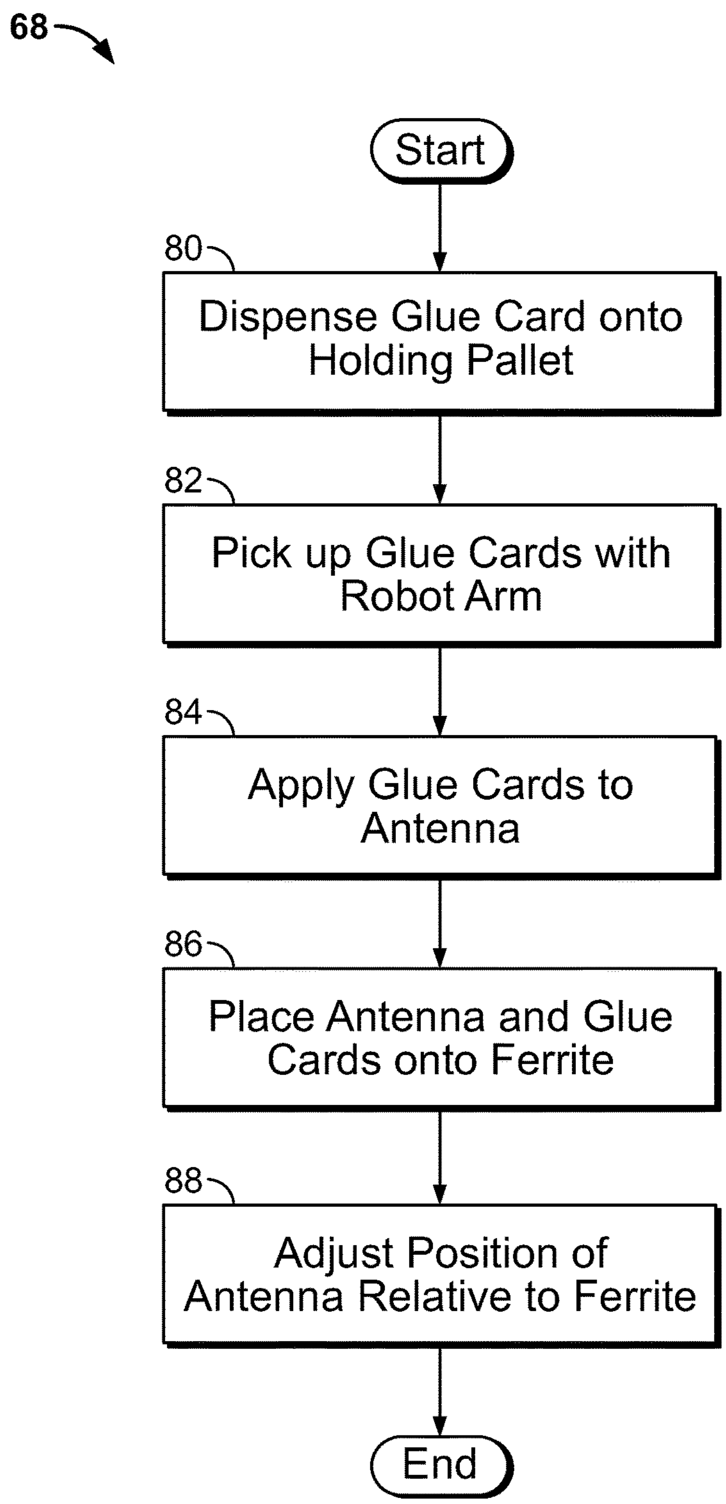
FIG. 3 is a flowchart showing steps for applying an antenna to a ferrite substrate.

FIG. 3 is a flowchart showing steps for applying an NFC antenna to ferrite, such as by using a labeling machine. In step 80, the label machine (or operator) dispenses one or more glue cards onto a holding pallet, preferably such that the glue-side is facing down. In step 82, a robot arm of the labeling machine picks up the glue cards, preferably from the top of the card (e.g., by suction). In step 84, the robot arm holding all of the glue cards then lowers/places the glue cards onto the antennas, such that each antenna adheres to the glue-side of the glue card. In this way, when the robot arm lifts up the glue card again, the antenna is lifted as well. In step 86, the robot arm then lowers/places the antenna and glue card onto the ferrite. In step 88, prior to lifting the robot arm up, the system and/or user adjusts the position of the antenna relative to the ferrite. Adjusting the position of the antenna relative to the ferrite provides adjustments in the functional properties of the antenna assembly, such as those related to frequency and inductance.

Figure 4:
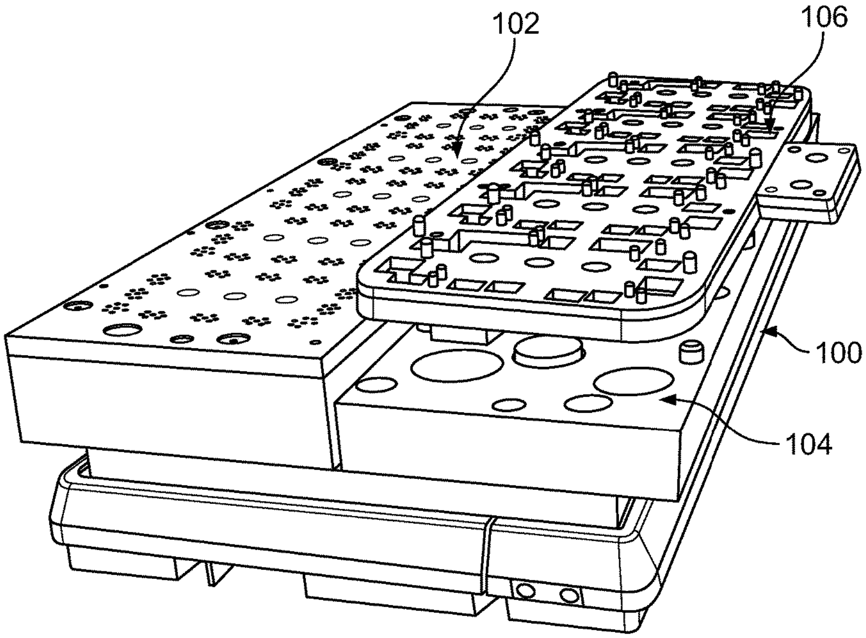
FIG. 4 is a view of a pallet used in optimizing an NFC antenna.
Figure 5:
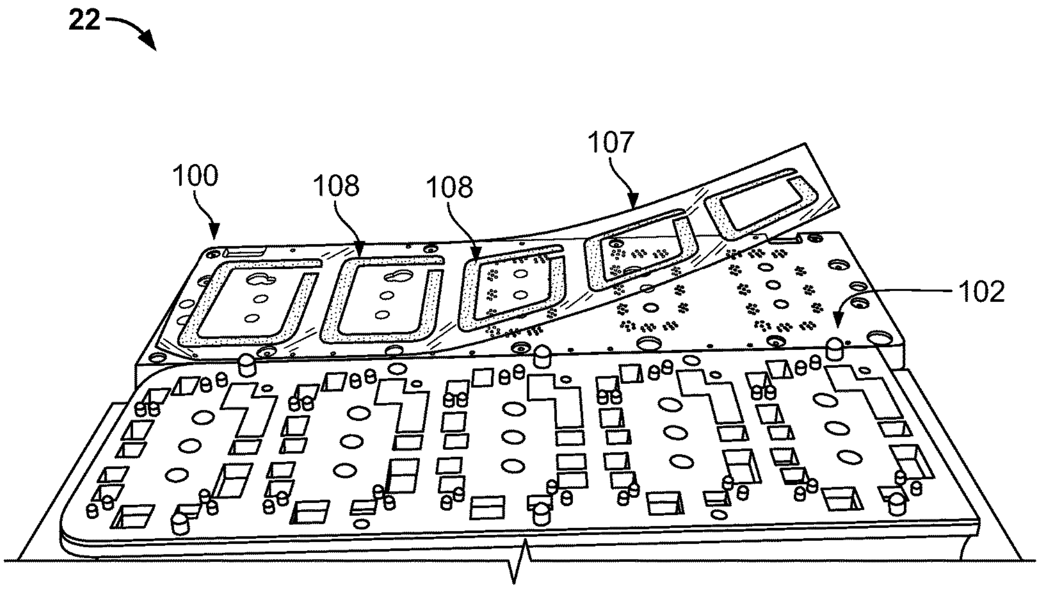
FIG. 5 is a view of ferrite being applied to the pallet of FIG. 4.
Figure 6:
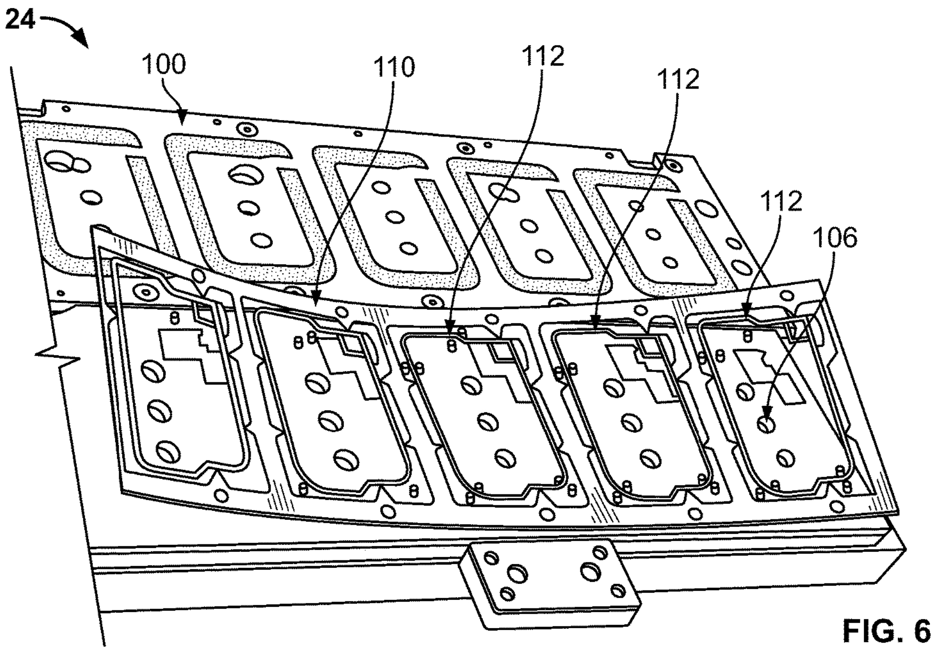
FIG. 6 is a view of a biscuit being applied to the pallet of FIG. 4.
Figure 7:
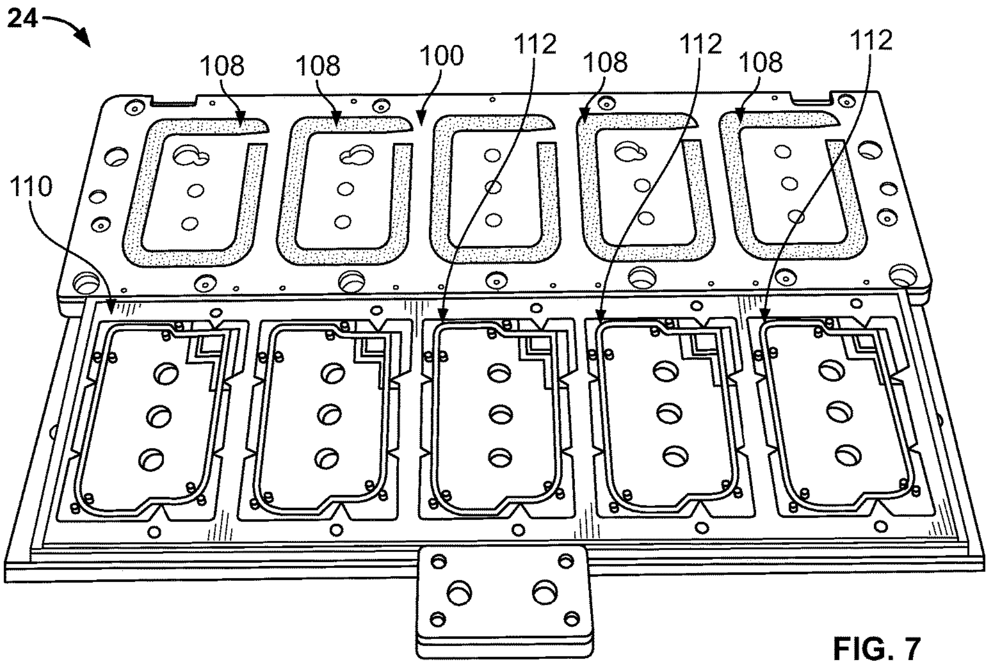
FIG. 7 is a view of the pallet with the ferrite and biscuit applied thereto.

FIGS. 4-15 are views of manufacturing and tuning an NFC antenna using the stations described above. FIGS. 4-7 are views showing a pallet being set up with ferrite substrates and an antenna biscuit. More specifically, FIG. 4 is a view of a pallet 100 and paddle 106. As shown, the pallet 100 includes a ferrite substrate area 102 and a paddle area 104 for the paddle 106, which receives one or more antennas. FIG. 5 is a view of a liner 107 of ferrite substrates 108 being applied to the pallet 100 at the ferrite loading station 22 (discussed above). The ferrite substrate area 102 could include guidepins for facilitating the loading of ferrite 108 onto the pallet. Once loaded, a vacuum could be applied to the pallet so that the ferrite substrates 108 are secured relative to the pallet 100 for ferrite liner removal. In addition to (or instead of) the vacuum, magnets could be provided in the pallet 100 to secure the relative position of the ferrite substrates 108. Once secured, the liner 107 is removed from the ferrite substrates 108 without altering the position of the ferrite substrate 108 relative to the pallet 100. FIG. 6 is a view of an antenna biscuit 110 being applied to the paddle 106 on pallet 100 at the antenna loading station 24. The biscuit 110 has a plurality of antennas 112 interconnected with one another (e.g., by a frame). FIG. 7 is a view of a pallet 100 with the ferrite substrates 108 and antenna biscuit 110 (with a plurality of antennas 112) applied to the pallet 100 at the antenna loading station 24.

Figure 8:
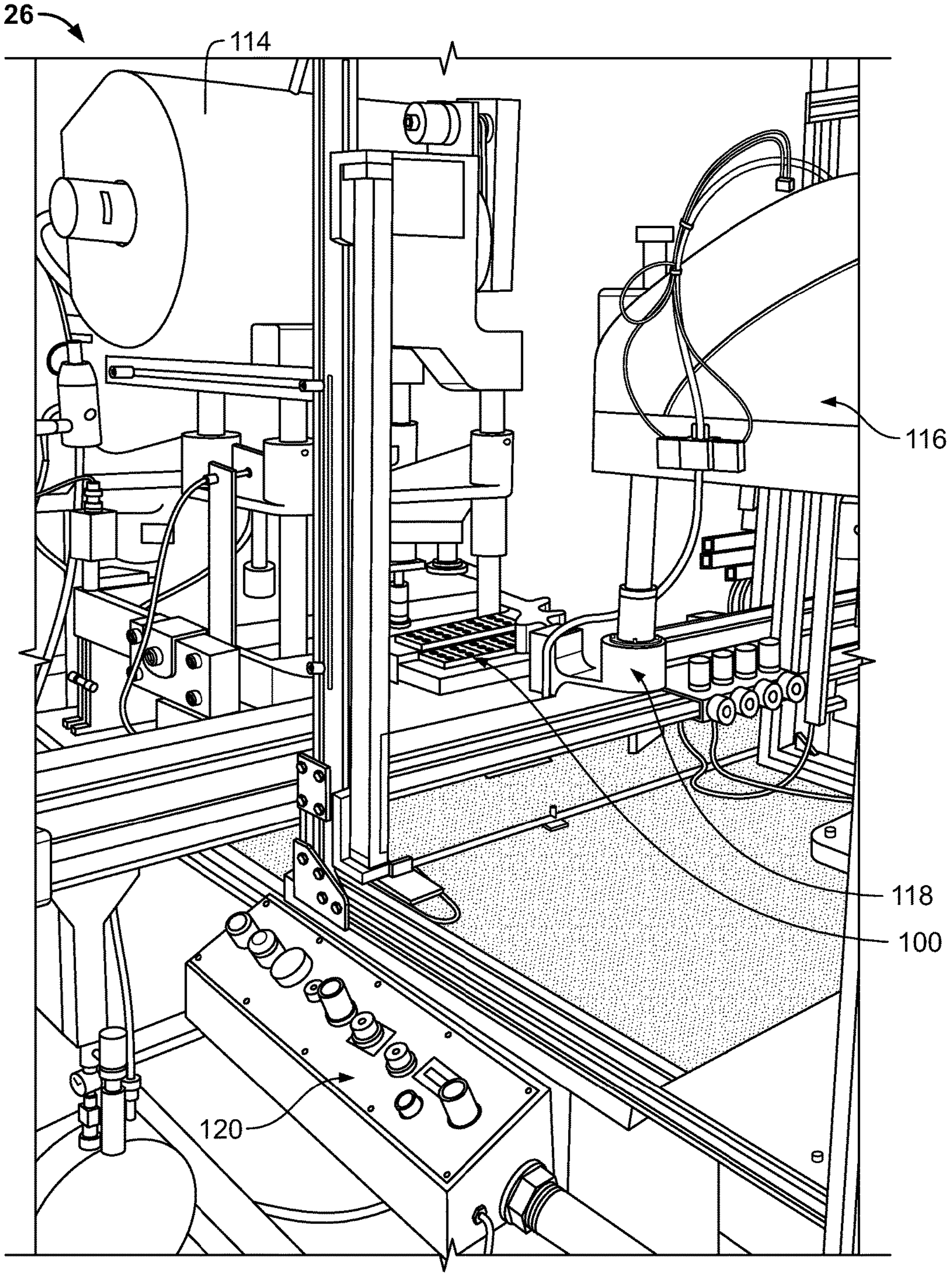
FIG. 8 is a view of a stamping station.
Figure 9:
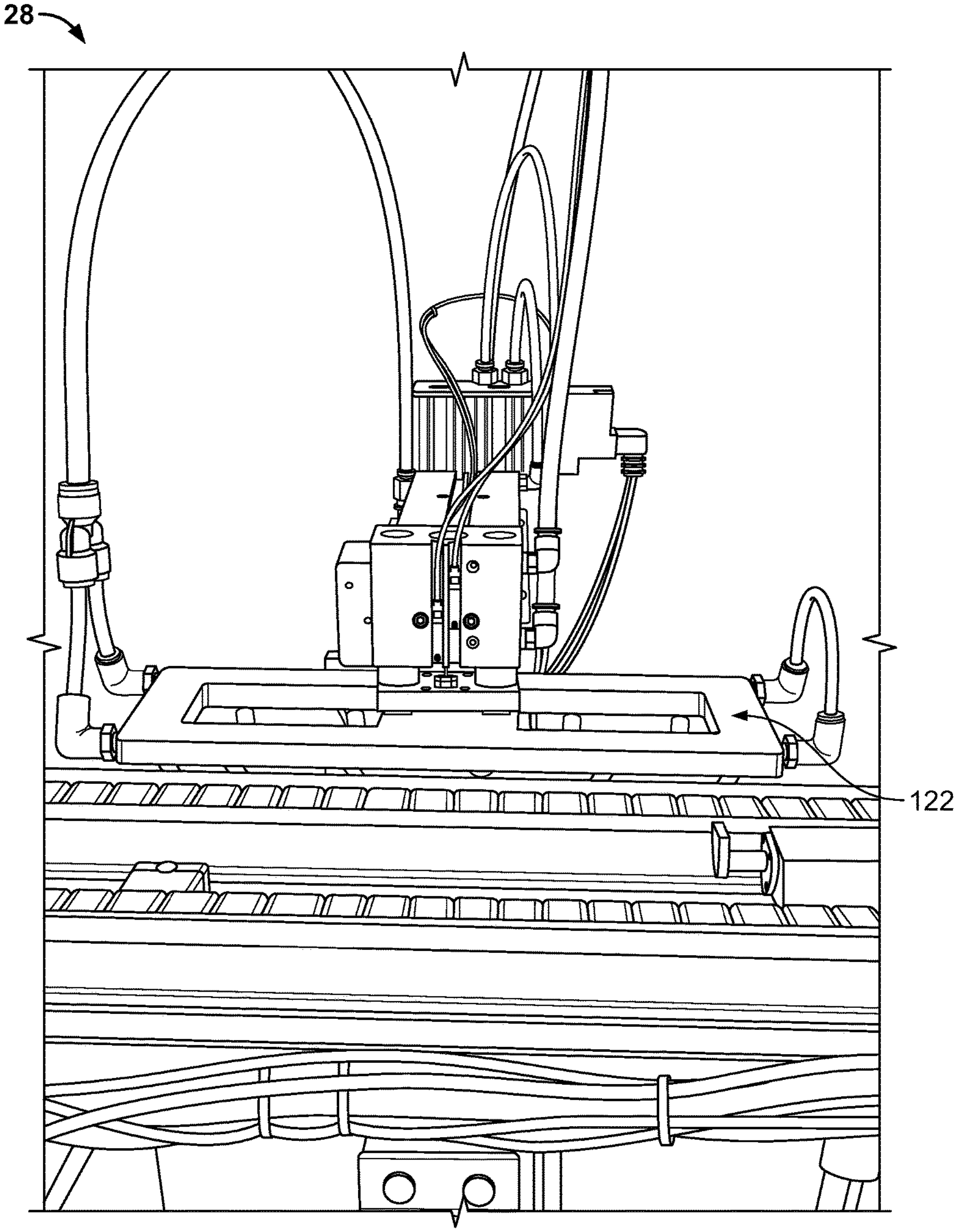
FIG. 9 is a view of a scrap removal station.
Figure 10:
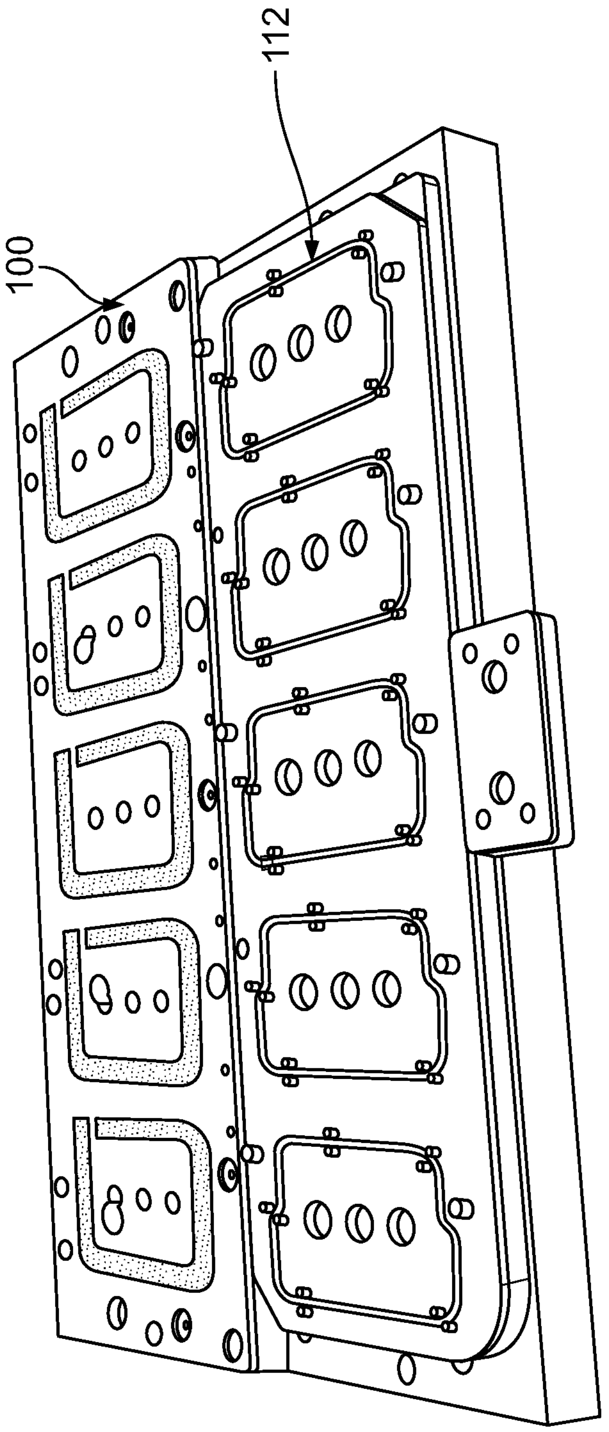
FIG. 10 is a view of the pallet with singulated antennas.

FIGS. 8-10 are views related to stamping and separating antennas of the antenna biscuit. More specifically, FIG. 8 is a view of a stamping station 26. As shown, the station 26 includes a stamping press 114 and a robotic system 116 having a robotic arm 118. The robotic system 116 is controllable and programmable from control system 120. The robotic arm 118 picks up and moves the paddle from the pallet 100 to the stamping press 114, where the antenna biscuit 110 is stamped and the antennas 112 are separated from one another and from the biscuit.

FIG. 9 is a view of a scrap removal station 28. At the scrap removal station 28, the singulated antennas and ferrite substrates are secured in place on the pallet by magnets within the pallet. A robotic arm 122 at the scrap removal station 28 includes a vacuum with ports on the underside of the robotic arm 122 to pick up and dispose the frame of the antenna biscuit. The remaining scraps can then be blown off the end effector by a user and/or robotic system. FIG. 10 is a view of a pallet 100 with singulated antennas 112 after the scraps have been removed.

Figure 11:
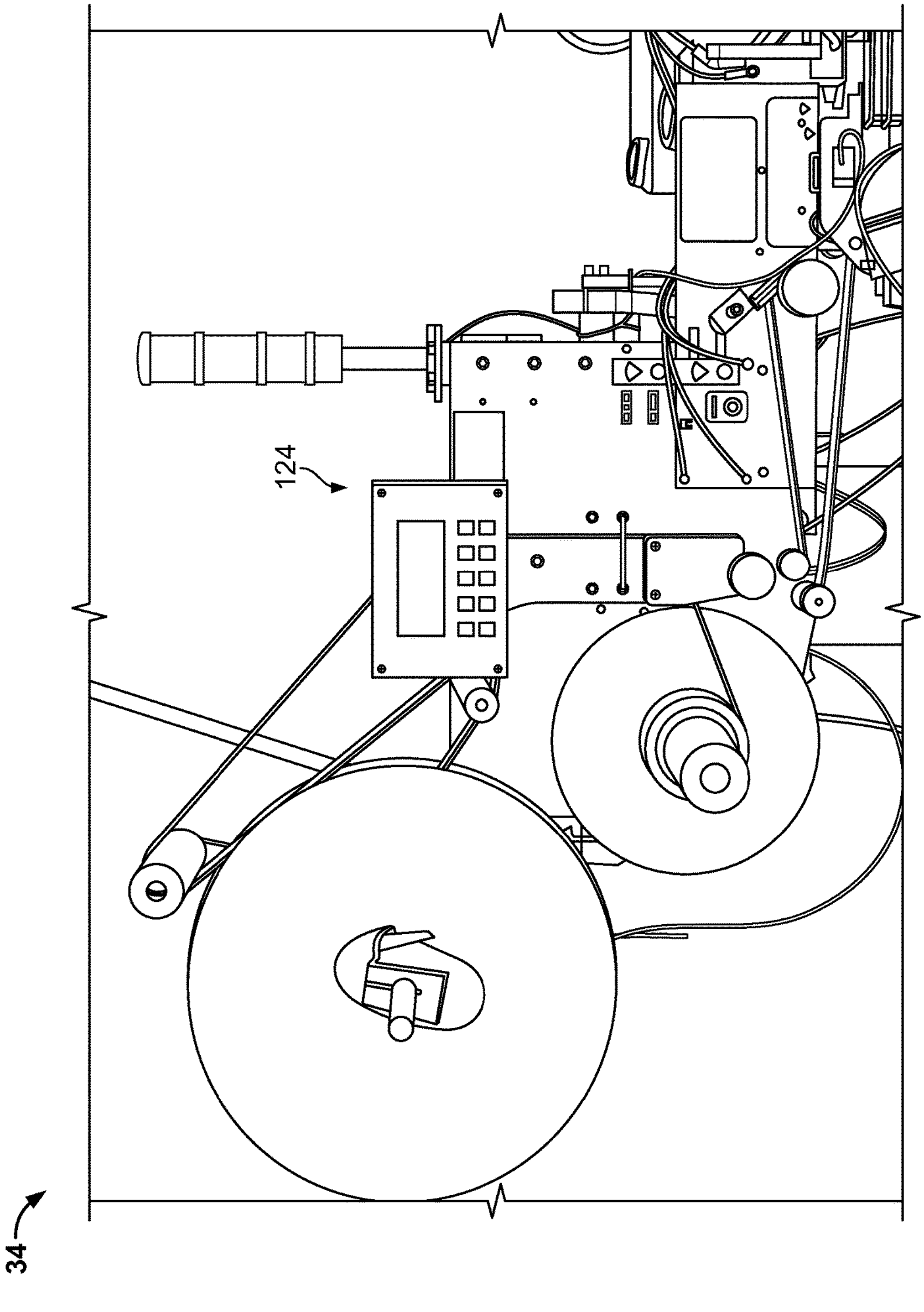
FIG. 11 is a view of a labeling machine used at an antenna application and tuning station.
Figure 12A:
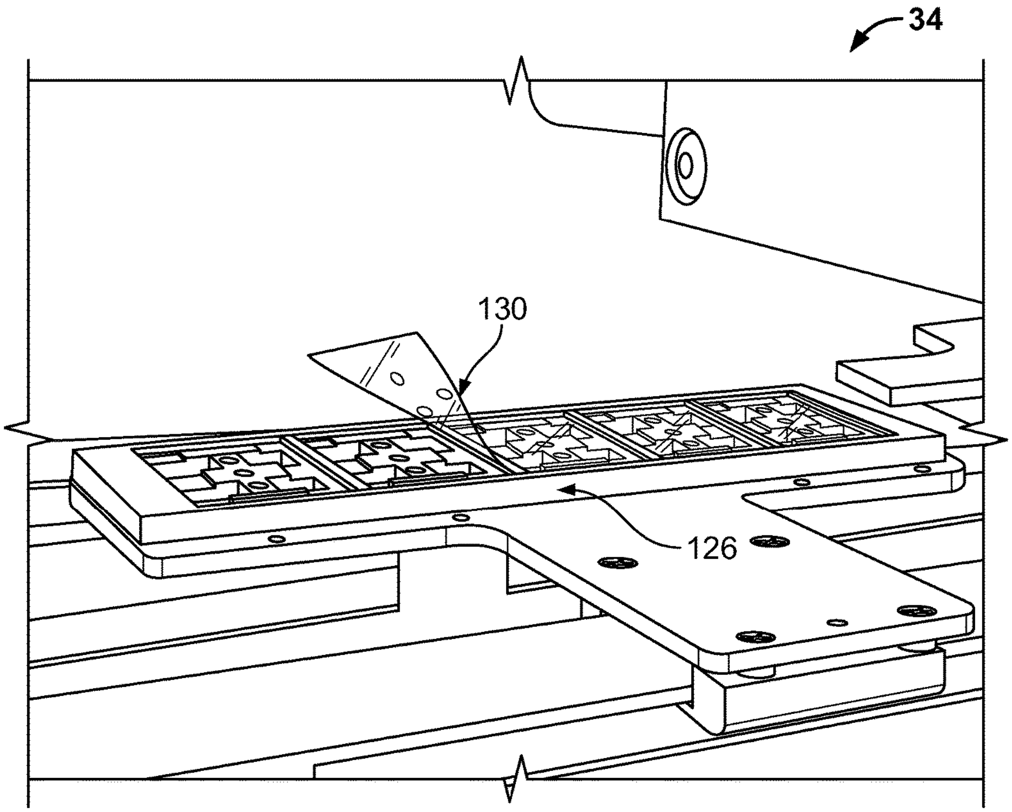
FIG. 12*a* is a view of glue cards on a holding tray at the antenna application and tuning station.
Figure 12B:
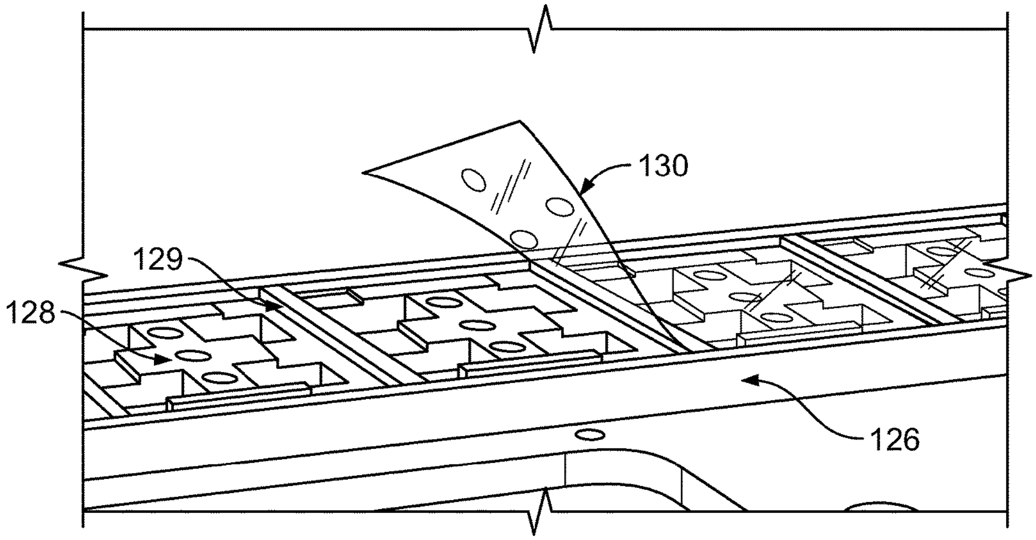
FIG. 12*b* is a close-up view of FIG. 12*a;*
Figure 13:
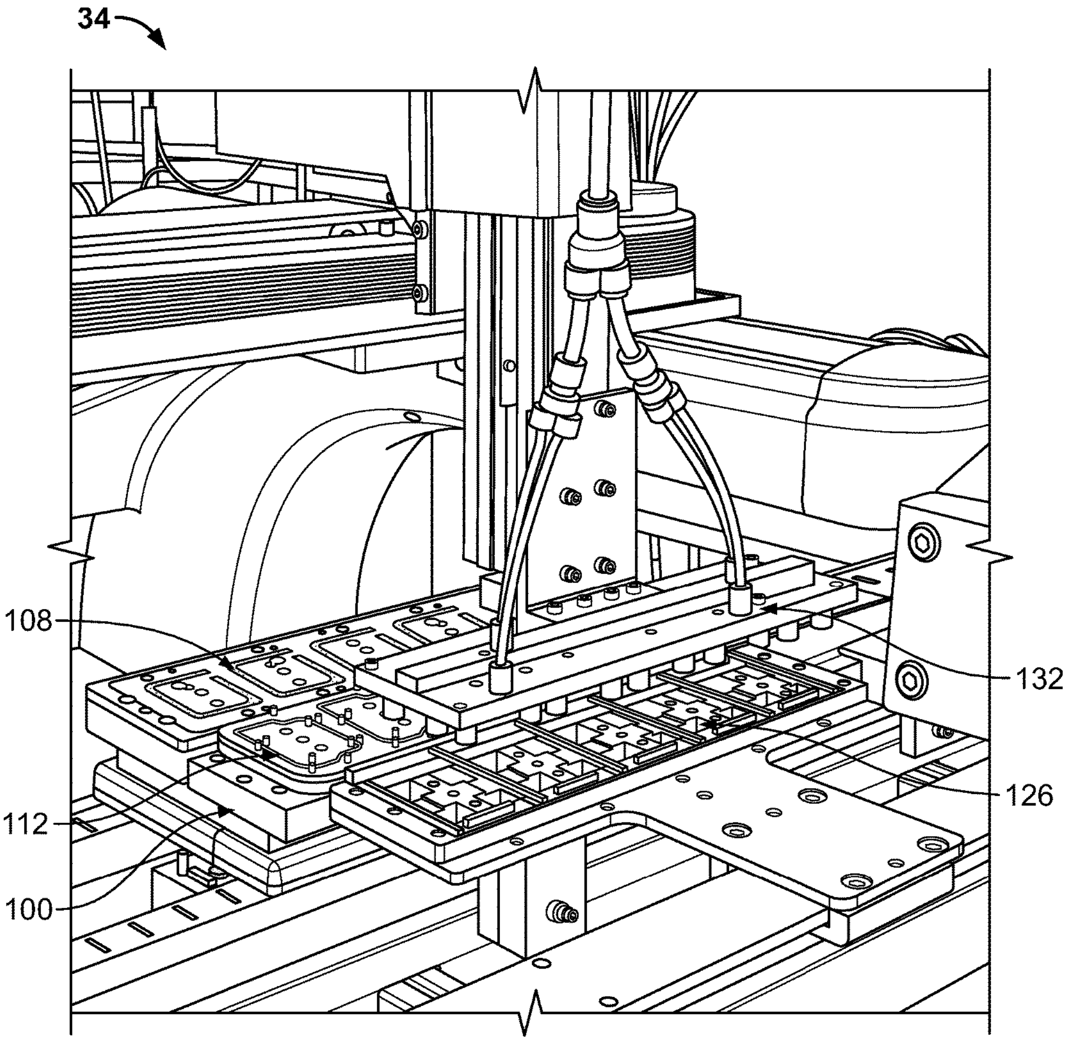
FIG. 13 is a view of the holding tray and pallet at the antenna application and tuning station.

FIGS. 11-13 are views of the antenna application and tuning station 34. More specifically, FIG. 11 is a view of a labeling machine 124 used at the antenna application and tuning station 34. The labeling machine 124 dispenses glue cards as described below. Any suitable machine or labeling machine capable of dispensing the glue cards could be used.

FIG. **12*a* is a view of glue cards 130 on a holding tray 126 at the antenna application and tuning station 34. FIG. 12*b* is a close-up view of FIG. 12*a*. As shown, the glue cards 130 are distributed by the label machine glue-side down onto receiving pockets 128 on the holding tray 126 (e.g., by blowing the glue cards 130 onto the holding tray 126). The receiving pockets 128 retain the glue cards on the holding tray 126. The receiving pockets preferably have a lip 129 so that only the outer border of the glue card 130 contacts any portion of the holding tray 126, which protects the glue on the glue card 130**.

FIG. 13 is a view of the holding tray 126 and pallet 100 at the label station 34. As shown, the label station 34 could handle a plurality of glue cards and antennas at one time. A robotic arm 132 of a robotic system includes suction ports on an underside of the robotic arm 132. The robotic arm 132 lowers onto the holding tray 126 and picks up the glue cards from the holding tray 126 using the suction ports. The holding tray 126 could move between several positions, such as a position to receive glue cards from the label machine, and a position to provide the robotic arm with access to the glue cards.

The robotic arm 132 lifts the glue cards from the holding tray 126 and positions the glue cards over the antennas 112. The robotic arm 132 lowers the glue cards onto the antennas 112, thereby adhering the antennas 112 to the glue cards. The robotic arm 132 then lifts the antennas 112 secured to the glue cards and positions the antennas 112 and glue cards over the ferrite substrates 108. Once the antennas 112 are in a desired position relative to the ferrite substrates 108, the antennas 112 are lowered onto the ferrite substrates 108. The robotic arm 132 positions the antennas 112 before the antennas 112 contact the ferrite substrates 108. The robotic arm 132 can shift the antennas 112 relative to the ferrite substrates 108 (e.g., by nanometers) before adhering the antennas 112 to the ferrite 108. Such movement could be side-to-side, for example, to tune and adjust functional properties of the final antenna assembly (e.g., frequency, inductance) to compensate for changes in ferrite porosity among different ferrite batches. Changing the inductance changes the frequency of the antenna assembly because there is a correlation between the two properties.

The antenna assembly can then be optimized by measuring the inductance for changes in the position of the antenna 112 relative to the ferrite substrate 108. More specifically, the antenna assembly is optimized by applying the antenna 112 in a specific position relative to a ferrite substrate 108 for a particular ferrite batch, and testing the functional properties of that particular assembly. The position of the antenna 112 relative to the ferrite substrate 108 is recalibrated based on the results of the tests, and then retested (although alternatively a different antenna and a different ferrite substrate from the same ferrite batch could be used). Recalibration and retesting continues until the functional properties of the antenna assembly have been optimized for a particular ferrite batch, and then that particular position is applied to all antenna assemblies for the particular ferrite batch (ferrite substrates 108 in each ferrite batch usually have the same, or very similar, properties). This optimization procedure is repeated for each ferrite batch, because the properties of ferrite substrates 108 vary between different ferrite batches. The antenna assemblies are then monitored and tested (as described below) to ensure that each has the desired optimized functional properties, and the system can be recalibrated if a problem arises. An adaptive feedback system could also be employed to make positioning adjustments.

Figure 14:
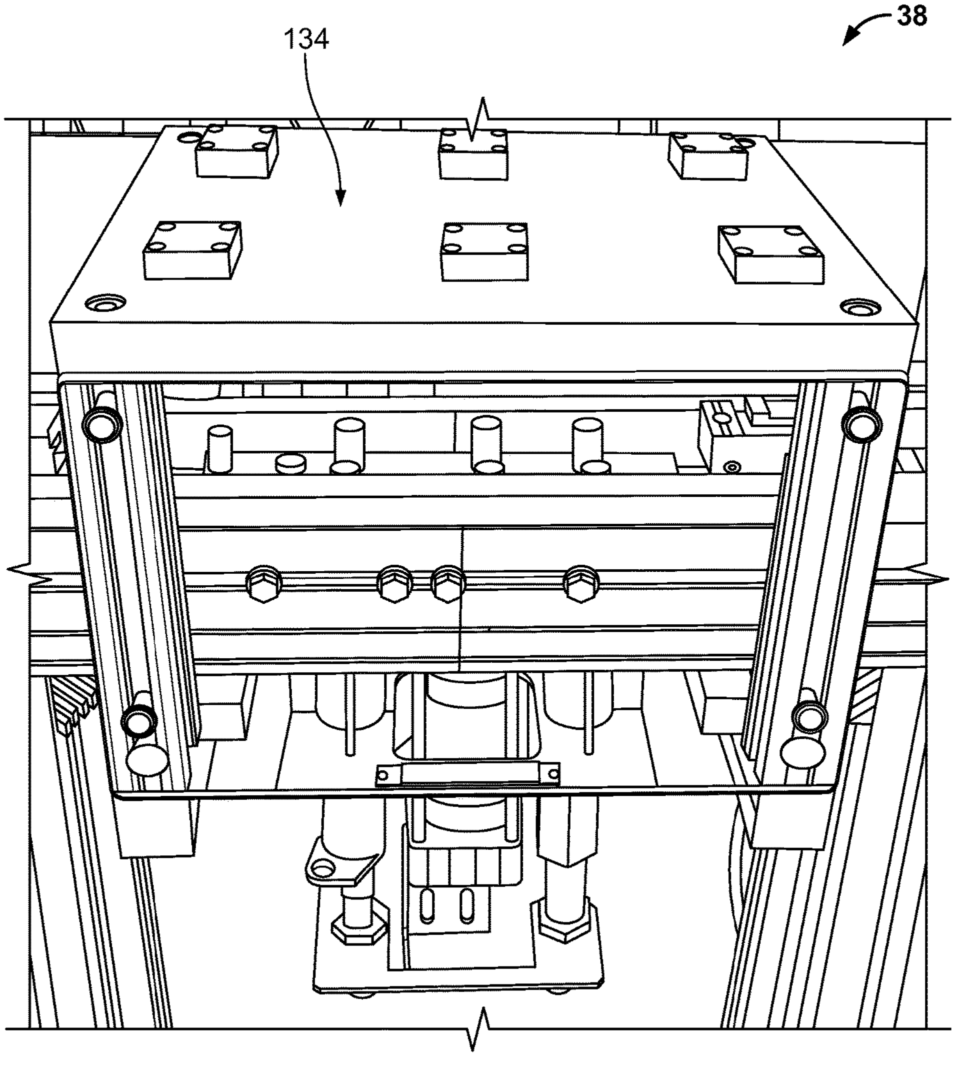
FIG. 14 is a view of a press station.

FIG. 14 is a view of the press station 38. As shown, the press lifts the pallet 100 containing the antenna assemblies off of the track until the pallet 100 and antenna assemblies come into contact with a stop underneath a ceiling 134, such as a rubber or other stop. The pressure between the press station ceiling 134 and the pallet further secures and solidifies the antenna assembly connections.

Figure 15:
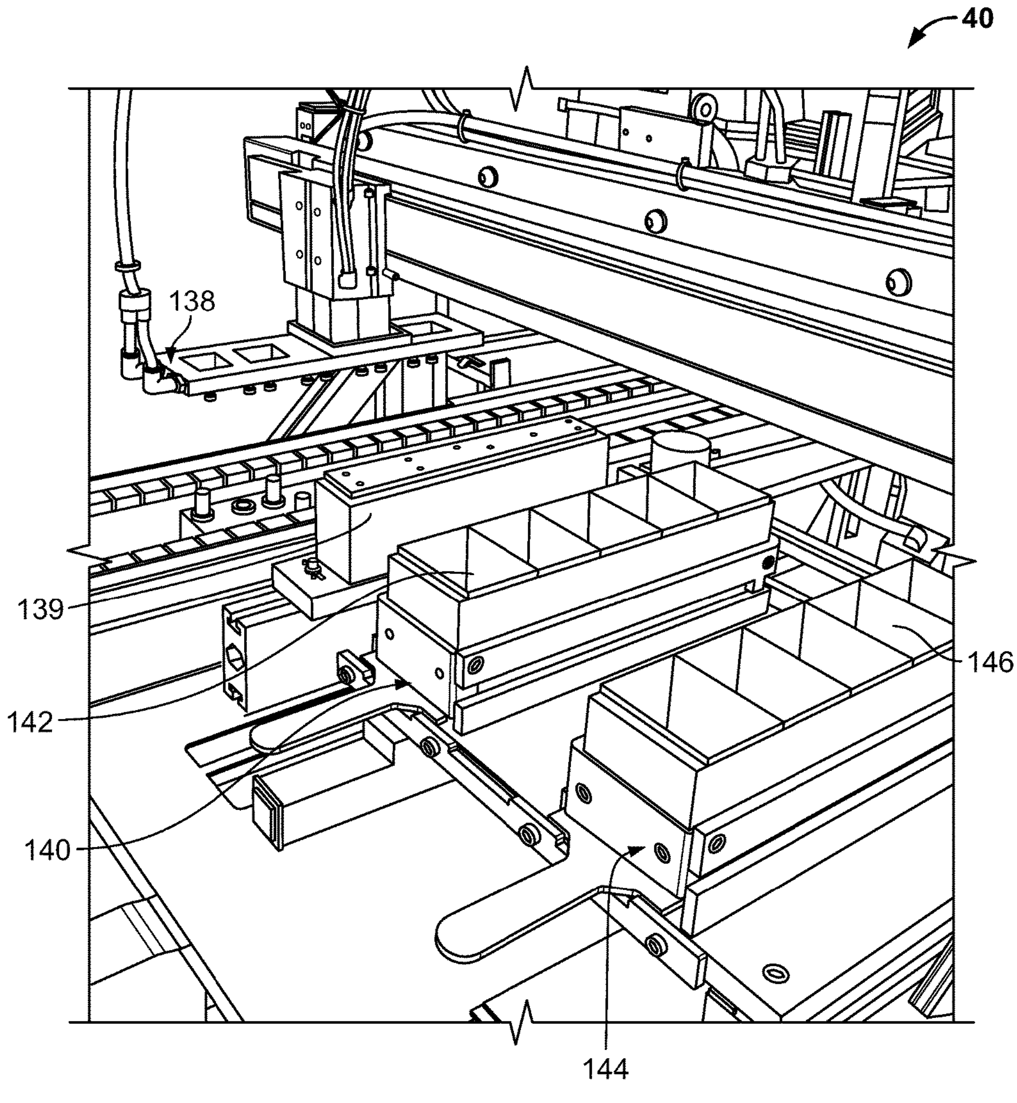
FIG. 15 is a view of a test station.

FIG. 15 is a view of the test station 40. As shown, the test station 40 includes a robotic arm 138 which lifts the antenna assemblies from the pallet and places them on a testing apparatus 139. The plurality of antenna assemblies are then tested (e.g., impedance, inductance, resistance, etc.) by the testing bed 139 to ensure quality control. The test bed 139 includes probes to test for inductance or other functional properties. Additionally, while the antenna assemblies are tested a printer head could print identifying information (e.g., code) onto the antenna assemblies. If all of the antenna assemblies pass the test they are placed in compartments 142 of a compliant container 140. If any one of the antenna assemblies fail the test, all of the antenna assemblies of that batch are placed in compartments 146 of a non-compliant container 144. Those placed in the non-compliant container 144 can then be re-tested to find the specific non-compliant antenna assembly. However, the system could also differentiate which specific antenna assembly of a batch failed the test and place only that specific antenna assembly in the non-compliant container 144.

Having thus described the invention in detail, it is to be understood that the foregoing description is not intended to limit the spirit or scope thereof. It will be understood that the embodiments of the present invention described herein are merely exemplary and that a person skilled in the art may make any variations and modification without departing from the spirit and scope of the invention. All such variations and modifications, including those discussed above, are intended to be included within the scope of the invention.

The invention claimed is:

1. A system for manufacturing and tuning a near field communication antenna comprising:

a ferrite station configured to facilitate loading a first set of one or more ferrite substrates of a particular ferrite group onto a workstation;

an antenna station configured to facilitate loading a first set of one or more individual antennas onto the workstation; and an antenna application and tuning station including a robotic arm configured to position and adjust a placement of respective individual antennas from the first set of the one or more individual antennas relative to respective ferrite substrates from the first set of the one or more ferrite substrates of the particular ferrite group, apply the respective individual antennas from the first set of the one or more individual antennas to the respective ferrite substrates from the first set of the one or more ferrite substrates of the particular ferrite group to form a first set of one or more antenna assemblies, and adjust, based on the application of the respective individual antennas from the first set of the one or more individual antennas relative to the respective ferrite substrates from the first set of the one or more ferrite substrates, a placement of other respective individual antennas from a second set of one or more individual antennas relative to other respective ferrite substrates from a second set of one or more ferrite substrates of the particular ferrite group to form a second set of one or more antenna assemblies and improve functional properties of the second set of one or more antenna assemblies.

2. The system of claim 1, further comprising a test station configured to test the individual antennas for quality control.

3. The system of claim 1, wherein the functional properties include frequency and inductance.

4. The system of claim 1, wherein the one or more antennas are interconnected with one another to form an antenna biscuit when loaded onto the workstation at the antenna station, and further comprising a stamping station configured to stamp the antenna biscuit to form the one or more individual antennas.

5. The system of claim 1, further comprising a press station configured to further solidify contact between the respective individual antennas from the first set of the one or more individual antennas to the respective ferrite substrates from the first set of the one or more ferrite substrates of the particular ferrite group.

6. The system of claim 1, wherein the antenna application and tuning station comprises a label machine to dispense glue cards to apply the respective individual antennas from the first set of the one or more individual antennas to the respective ferrite substrates from the first set of the one or more ferrite substrates of the particular ferrite group.

7. A system for manufacturing and tuning a near field communication antenna comprising:

a ferrite station configured to facilitate loading a first set of one or more ferrite substrates of a particular ferrite group onto a workstation;

an antenna station configured to facilitate loading a first set of one or more individual antennas onto the workstation;

an antenna application and tuning station including a controller for a robotic arm to position and adjust a placement of respective individual antennas from the first set of the one or more individual antennas relative to respective ferrite substrates from the first set of the one or more ferrite substrates of the particular ferrite group before applying the respective individual antennas from the first set of the one or more individual antennas to the respective ferrite substrates from the first set of the one or more ferrite substrates at a first location to form a first set of one or more antenna assemblies; and a test station to test functional properties of the first set of the one or more antenna assemblies, wherein the controller moves the robotic arm to adjust, based on a testing result of the first set of the one or more antenna assemblies, a placement of other respective individual antennas from a second set of one or more individual antennas relative to other respective ferrite substrates from a second set of one or more ferrite substrates of the particular ferrite group, and apply the other respective individual antennas from the second set of the one or more individual antennas to the other respective ferrite substrates from the second set of the one or more ferrite substrates of the particular ferrite group at a second location different than the first location to form a second set of one or more antenna assemblies and improve functional properties of the second set of one or more antenna assemblies.

8. The system of claim 7, further comprising a test station configured to test the individual antennas for quality control.

9. The system of claim 7, wherein the functional properties include frequency and inductance.

10. The system of claim 7, wherein the one or more antennas are interconnected with one another to form an antenna biscuit when loaded onto the workstation at the antenna station, and further comprising a stamping station configured to stamp the antenna biscuit to form the one or more individual antennas.

11. The system of claim 7, further comprising a press station configured to further solidify contact between each of the antennas and ferrite substrates.

12. The system of claim 7, wherein the antenna application and tuning station comprises a label machine to dispense glue cards to apply the one or more individual antennas to the one or more ferrite substrates.

* * * * *